(12) United States Patent
Bohn et al.

(10) Patent No.: US 9,404,545 B2
(45) Date of Patent: Aug. 2, 2016

(54) COMBINED POWER TAKE-OFF AND HYDRAULIC PUMP ASSEMBLY

(75) Inventors: James E. Bohn, Olive Branch, MS (US); Darrel Hannaford, West Midlands (GB); Brian L. Rang, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 391 days.

(21) Appl. No.: 13/983,357

(22) PCT Filed: Feb. 7, 2012

(86) PCT No.: PCT/US2012/024061
§ 371 (c)(1),
(2), (4) Date: Aug. 28, 2013

(87) PCT Pub. No.: WO2012/109180
PCT Pub. Date: Aug. 16, 2012

(65) Prior Publication Data
US 2013/0327031 A1    Dec. 12, 2013

Related U.S. Application Data

(60) Provisional application No. 61/439,944, filed on Feb. 7, 2011.

(51) Int. Cl.
*F16D 33/00* (2006.01)
*F04B 27/08* (2006.01)
(Continued)

(52) U.S. Cl.
CPC ............... *F16D 33/00* (2013.01); *F04B 17/05* (2013.01); *F04B 27/0891* (2013.01); *F04B 27/1081* (2013.01); *F04B 39/121* (2013.01); *F04B 53/16* (2013.01); *F04B 53/22* (2013.01)

(58) Field of Classification Search
CPC .......... F04B 17/05; F04B 53/16; F04B 53/22; F04B 27/0891; F04B 27/1081; F04B 39/121; F04B 39/16; F16D 33/00
USPC ..................... 60/423, 435, 487, 396
See application file for complete search history.

(56) References Cited

U.S. PATENT DOCUMENTS 1,190,804 A    7/1916  Scaife
1,456,201 A    5/1923  Vincent
(Continued)

FOREIGN PATENT DOCUMENTS

DE    10201365 A1    7/2003

*Primary Examiner* — Logan Kraft
(74) *Attorney, Agent, or Firm* — MacMillan, Sobanski & Todd, LLC

(57) ABSTRACT

A combined power take-off and hydraulic pump assembly includes a power-take off including a housing portion having an opened end, an input put mechanism that is adapted to be connected to a source of rotational energy, and an output mechanism that is rotatably driven by the input mechanism. The assembly also includes a hydraulic pump including a housing portion having an opened end, a fluid inlet port that is adapted to communicate with a reservoir containing a quantity of relatively low pressure hydraulic fluid, and a pumping mechanism that is rotatably driven by the output mechanism of the power take-off. An intermediate housing has a first opened end that cooperates with the opened end of the housing portion of the power take-off and a second opened end that cooperates with the opened end of the housing portion of the hydraulic pump. The intermediate housing also has a fluid outlet port that communicates with the pumping mechanism and that is adapted to communicate with a hydraulically driven device. The intermediate housing may also support a bearing that, in turn, supports a portion of the output mechanism of the power take-off.

18 Claims, 11 Drawing Sheets

(51) Int. Cl.
  *F04B 39/12* (2006.01)
  *F04B 27/10* (2006.01)
  *F04B 17/05* (2006.01)
  *F04B 53/16* (2006.01)
  *F04B 53/22* (2006.01)

(56) References Cited

U.S. PATENT DOCUMENTS

| | | | |
|---|---|---|---|
| 1,872,924 A | 8/1932 | Galanot | |
| 2,229,561 A | 1/1941 | Galanot | |
| 2,667,793 A | 2/1954 | Webster | |
| 2,690,712 A | 10/1954 | Foote | |
| 2,931,305 A | 4/1960 | Stratton | |
| 2,985,903 A * | 5/1961 | Oishei | B60S 1/12 |
| | | | 15/250.12 |
| 3,209,872 A * | 10/1965 | Moyer | B60K 17/28 |
| | | | 137/625.26 |
| 3,695,710 A | 10/1972 | Cresci et al. | |
| RE27,844 E * | 12/1973 | Olson, Jr. | F04B 27/10 |
| | | | 417/269 |
| 4,136,751 A | 1/1979 | Poore et al. | |
| 4,406,599 A | 9/1983 | Stephan | |
| 4,425,817 A | 1/1984 | Wells et al. | |
| 4,489,623 A | 12/1984 | Hakkenberg | |
| 4,542,801 A | 9/1985 | Richards et al. | |
| 4,865,389 A | 9/1989 | Martin | |
| 4,915,591 A * | 4/1990 | Funke | F04B 13/00 |
| | | | 417/18 |
| 5,228,355 A * | 7/1993 | Smith | B60K 17/28 |
| | | | 184/6.12 |
| 5,383,374 A | 1/1995 | Reynolds | |
| 5,542,306 A | 8/1996 | Fernandez | |
| 6,073,502 A | 6/2000 | Wallace | |
| 6,394,206 B1 | 5/2002 | Fury | |
| 6,840,137 B2 | 1/2005 | Kaplan et al. | |
| 7,150,693 B2 | 12/2006 | Ishimaru et al. | |
| 8,245,718 B2 * | 8/2012 | Busing | A47L 15/4225 |
| | | | 134/108 |
| 2002/0011125 A1 | 1/2002 | Wesley | |
| 2005/0150316 A1 | 7/2005 | Ishii et al. | |

\* cited by examiner

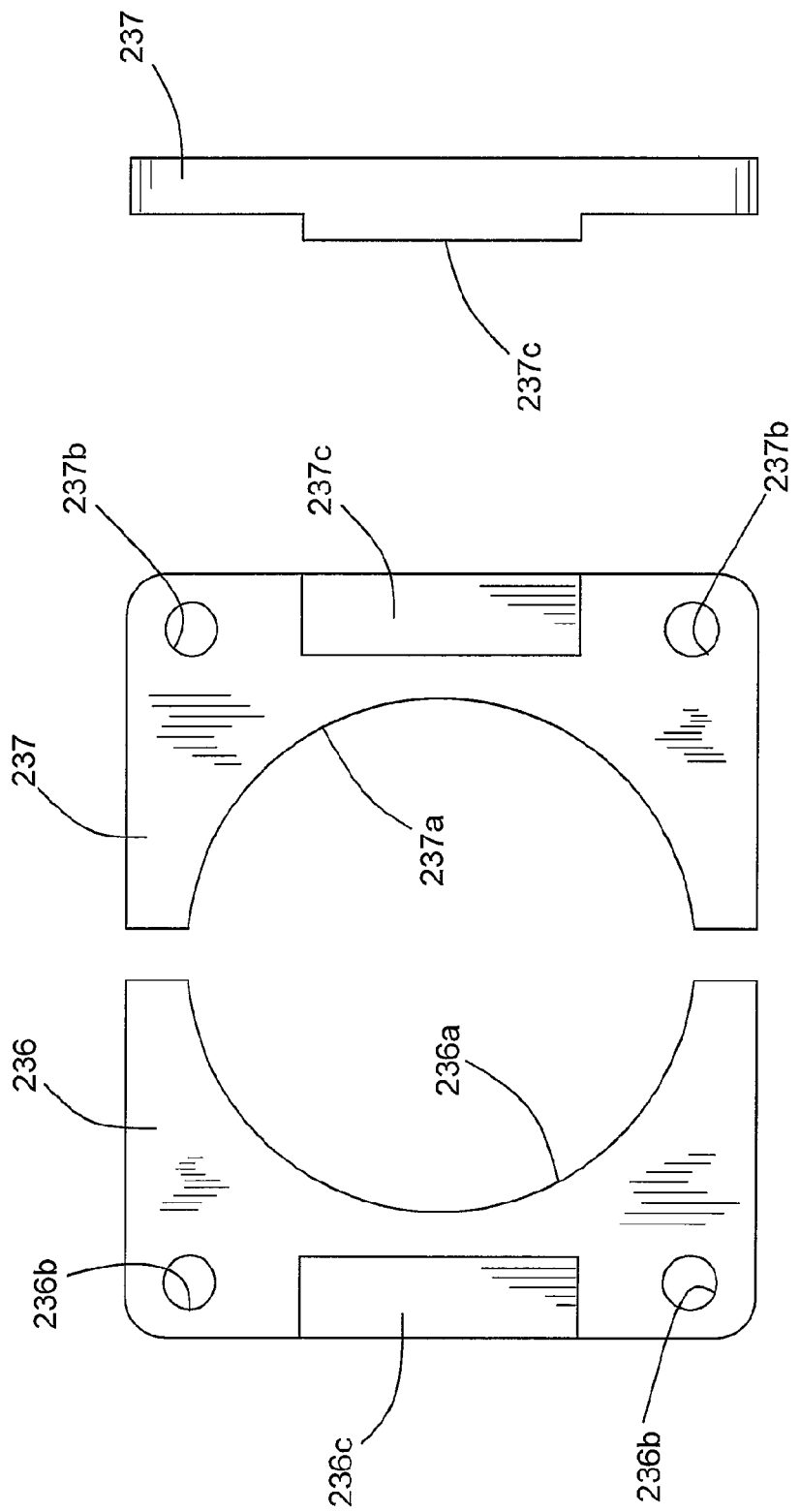

COMBINED POWER TAKE-OFF AND HYDRAULIC PUMP ASSEMBLY

CROSS-REFERENCE TO RELATED APPLICATIONS

This application claims the benefit of U.S. Provisional Application No. 61/439,944 filed Feb. 7, 2011, the disclosure of which is incorporated herein by reference.

BACKGROUND OF THE INVENTION

This invention relates in general to power take-offs for selectively providing rotational energy from a source of rotational energy to a driven accessory. In particular, this invention relates to an improved structure for a combined power take-off and hydraulic pump assembly having a reduced overall length, weight, and number of parts.

A power take-off is a well known mechanical device that is often used in conjunction with a source of rotational energy, such as a vehicle engine or transmission, to provide rotational energy to a driven accessory. For example, power take-offs are commonly used in industrial and agricultural vehicles to provide rotational energy to hydraulic pumps that, in turn, are used to operate hydraulically driven accessories such as plows, trash compactors, lifting mechanisms, winches, and the like. The power take-off provides a simple, inexpensive, and convenient means for supplying energy from the source of rotational energy to the hydraulic pump that, in turn, provides relatively high pressure fluid to operate the driven accessory.

A typical power take-off includes an input mechanism and an output mechanism. The input mechanism of the power take-off is adapted to be connected to the source of rotational energy so as to be rotatably driven whenever the source of rotational energy is operated. The output mechanism of the power take-off is adapted to be connected to the hydraulic pump. In some instances, the input mechanism of the power take-off is directly connected to the output mechanism such that the hydraulic pump is rotatably driven whenever the source of rotational energy is operated. In other instances, a clutch assembly is provided between the input mechanism and the output mechanism such that the hydraulic pump is selectively driven only when the source of rotational energy is operated and the clutch assembly is engaged.

A typical hydraulic pump includes a fluid inlet port, a fluid outlet port, and a pumping mechanism. The fluid inlet port is adapted to communicate with a reservoir containing a quantity of relatively low pressure hydraulic fluid, while the fluid outlet port is adapted to communicate with the hydraulically driven device. The pumping mechanism of the hydraulic pump is adapted to be connected to the output mechanism of the power take-off so as to be rotatably driven whenever the power take-off is operated. Thus, when the power take-off is operated, the hydraulic pump draws relatively low pressure hydraulic fluid from the reservoir and supplies a flow of relatively high pressure hydraulic fluid to the hydraulically driven device.

The components of the power take-off are typically supported within a housing that is closed to retain lubricant and to prevent the entry of dirt, water, and other contaminants therein. In many instances, the power take-off housing is formed from first and second power take-off housing portions that are separate from one another, but are secured together to form a sealed enclosure for the components of the power take-off. For example, the first power take-off housing portion may be generally hollow in shape, having an opened end and a closed end, while the second power take-off housing portion may be generally flat and circular. The second power take-off housing portion can be secured to the first power take-off housing portion so as to close the opened end thereof and thereby form the power take-off housing. Such a two-piece structure facilitates the assembly and servicing of the components of the power take-off, and further allows either or both of the input and output mechanisms of the power take-off to be rotatably supported on the closed end of the first power take-off housing portion and the second power take-off housing portion.

The components of the hydraulic pump are typically supported within a housing that is closed to retain hydraulic fluid therein. In many instances, the hydraulic pump housing is formed from first and second hydraulic pump housing portions that are separate from one another, but are secured together to form a sealed enclosure for the components of the hydraulic pump. For example, the first hydraulic pump housing portion may be generally hollow and cylindrical in shape, having an opened end and a closed end, while the second hydraulic pump housing portion may be generally flat and circular. The second hydraulic pump housing portion can be secured to the first hydraulic pump housing portion so as to close the opened end thereof and thereby form the hydraulic pump housing. Such a two-piece structure facilitates the assembly and servicing of the components of the hydraulic pump, and further allows the components of the hydraulic pump to be rotatably supported on the first housing portion, while the input and output fluid ports are provided in the second hydraulic pump housing portion.

Typically, the power take-off and the hydraulic pump have been provided as separate, stand-alone devices, each having respective housings that support and protect the associated components therein. Thus, to create a combined power take-off and hydraulic pump assembly for selectively providing rotational energy from a source of rotational energy to a driven accessory, it is known to initially select both a stand-alone power take-off and a stand-alone hydraulic pump that are considered to be appropriate for the desired application. Then, the housing of the hydraulic pump is mounted on the housing of the power take-off to form the combined power take-off and hydraulic pump assembly.

Although the manufacture and assembly of a combined power take-off and hydraulic pump assembly in this manner has been satisfactory, the need has arisen to reduce the overall length, weight, and number of parts of the combined power take-off and hydraulic pump assembly. Thus, it would be desirable to provide an improved structure for a combined power take-off and hydraulic pump assembly having a reduced overall length, weight, and number of parts.

SUMMARY OF THE INVENTION

This invention relates to an improved structure for a combined power take-off and hydraulic pump assembly having a reduced overall length, weight, and number of parts. The combined power take-off and hydraulic pump assembly includes a power take-off including a housing portion having an opened end and a hydraulic pump including a housing portion having an opened end. An intermediate housing has a first opened end that cooperates with the opened end of the housing portion of the power take-off and a second opened end that cooperates with the opened end of the housing portion of the hydraulic pump.

Various aspects of this invention will become apparent to those skilled in the art from the following detailed description of the preferred embodiments, when read in light of the accompanying drawings.

BRIEF DESCRIPTION OF THE DRAWINGS

FIG. 9 are further enlarged view of a pair of brackets used with the intermediate housing and bracket assembly illustrated in FIG. 8.

FIG. 10 is a side elevational view of one of the brackets used with the housing and bracket assembly illustrated in FIGS. 8 and 9.

DETAILED DESCRIPTION OF THE PREFERRED EMBODIMENTS

Figure 1:
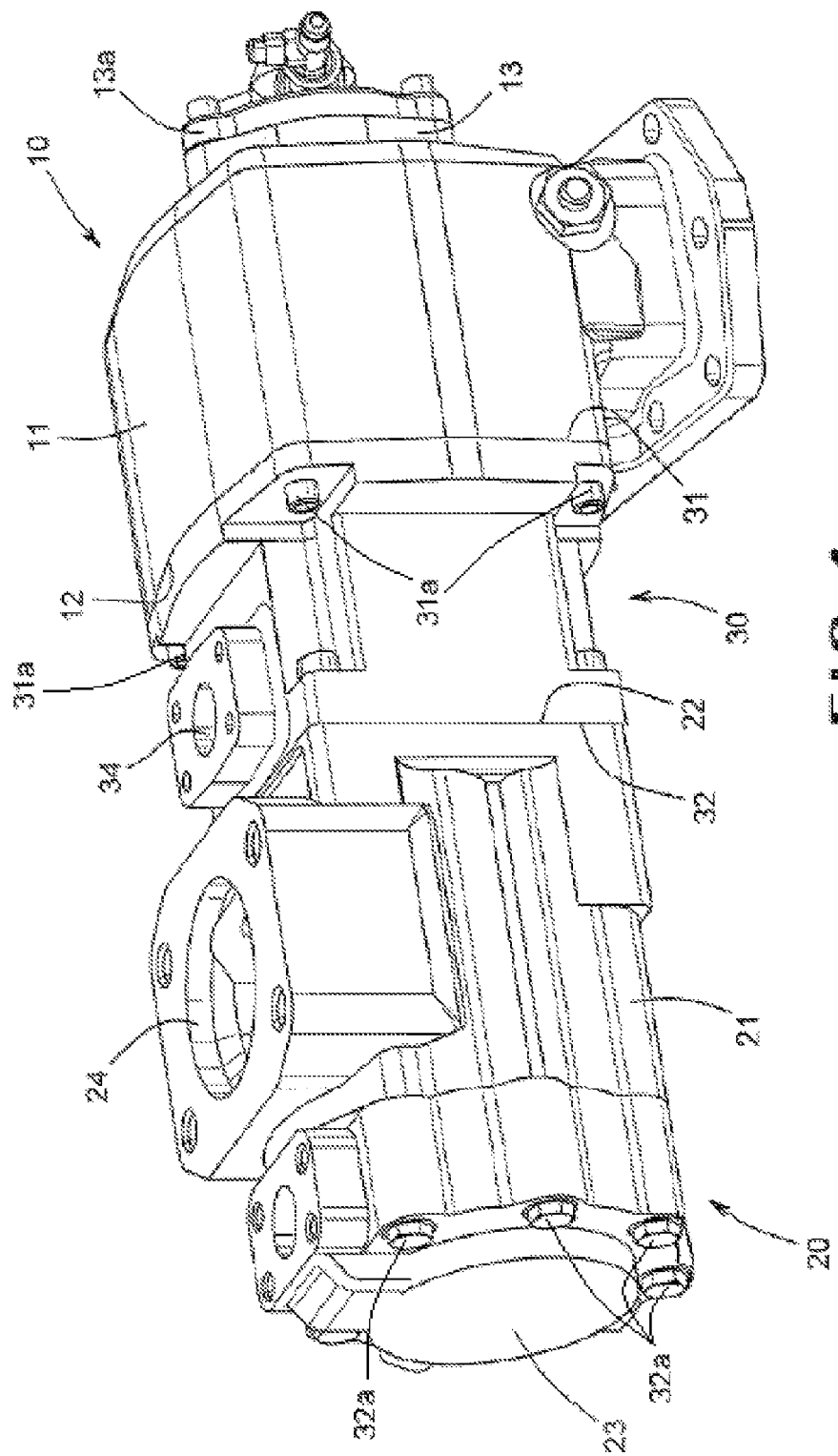
FIG. 1 is a perspective view of a first embodiment of a combined power take-off and hydraulic pump assembly in accordance with this invention.
Figure 2:
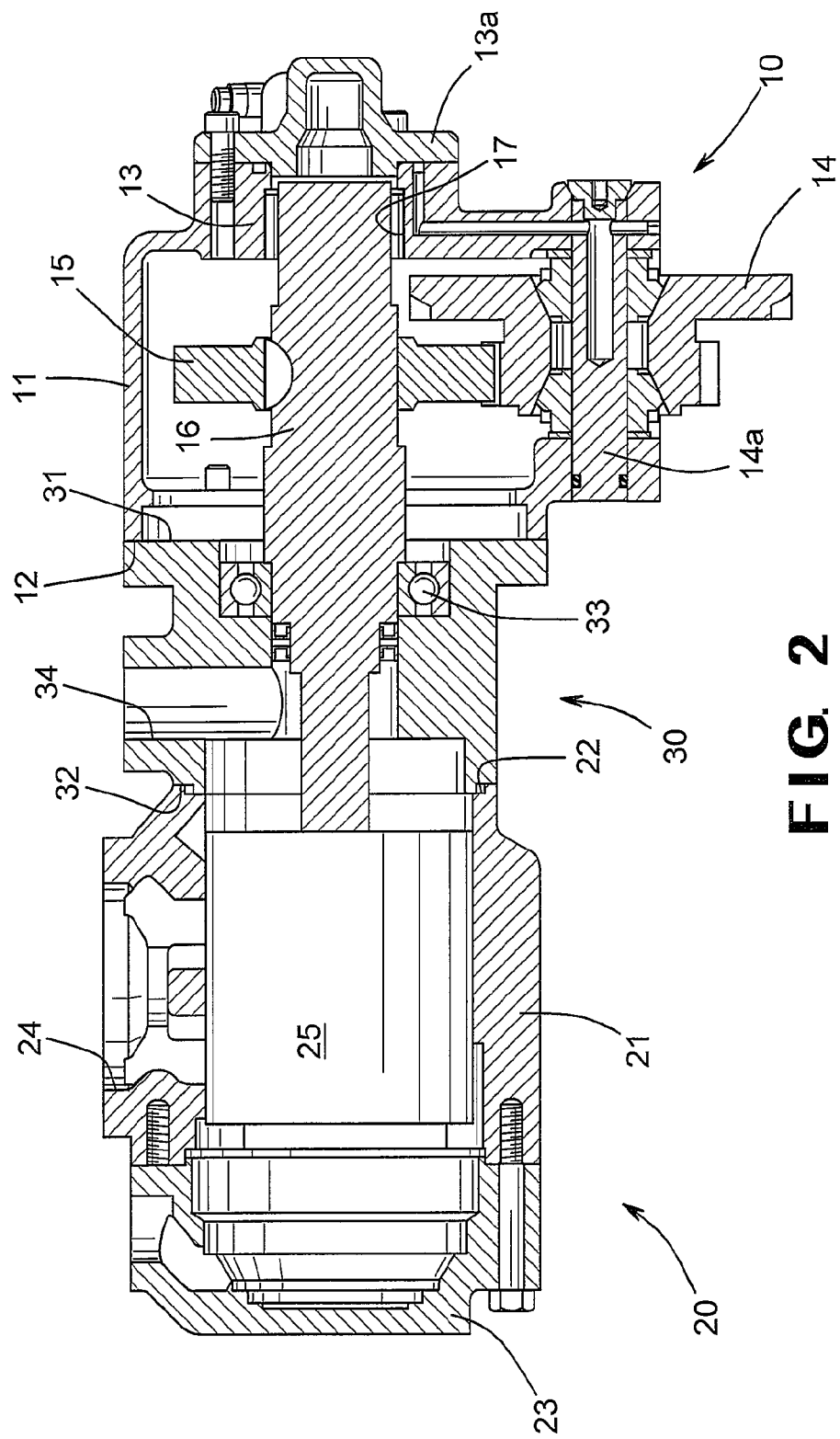
FIG. 2 is a sectional elevational view of the first embodiment of the combined power take-off and hydraulic pump assembly illustrated in FIG. 1.

Referring now to the drawings, there is illustrated in FIGS. 1 and 2 a first embodiment of a combined power take-off and hydraulic pump assembly in accordance with this invention. The first embodiment of the combined power take-off and hydraulic pump assembly includes a power take-off, indicated generally at 10, having a housing portion 11. The illustrated housing portion 11 of the power take-off 10 is generally hollow in shape, having an opened end 12 and a closed end 13. The housing portion 11 may have any desired shape. If desired, a portion of the closed end 13 of the housing portion 11 may be provided by a removable cap 13a or other similar closure.

The power take-off 10 includes an input mechanism that is adapted to be connected to a source of rotational energy so as to be rotatably driven whenever the source of rotational energy is operated, as described above. As best shown in FIG. 2, the input mechanism of the illustrated power take-off 10 includes an input gear 14 that is rotatably supported on an input shaft 14a that, in turn, is supported on the housing portion 11 of the power take-off 10. It can be seen that the input gear 14 extends laterally from the side of the housing portion 11 of the power take-off 10. Thus, the power take-off 10 is commonly referred to as a "side mount" type of power take-off because it is typically mounted on a lateral side of a source of rotational power (such as a conventional transmission), as opposed to an axial end thereof.

The power take-off 10 also includes an output mechanism that is adapted to be connected to a driven accessory, as also described above. As also best shown in FIG. 2, the output mechanism of the illustrated power take-off 10 includes an output gear 15 that keyed or otherwise connected for rotation with an output shaft 16. A first end (the right end when viewing FIG. 2) of the output shaft 16 is supported for rotation by bearings 17 that are, in turn, supported on the closed end 13 of the housing portion 11 of the power take-off 10. A second end (the left end when viewing FIG. 2) of the output shaft 16 is supported for rotation in a manner that will be described in detail below.

In the illustrated embodiment, the input gear 14 of the power take-off 10 is directly connected though the output gear 15 to the output shaft 16 such that the output shaft 16 is always driven whenever the source of rotational energy is operated. However, if desired, a conventional clutch assembly (not shown) may be provided between the input gear 14 and the output shaft 16 such that the output shaft 16 is selectively driven only when the source of rotational energy is operated and the clutch assembly is engaged.

The first embodiment of the combined power take-off and hydraulic pump assembly also includes a hydraulic pump, indicated generally at 20, having a housing portion 21. The illustrated housing portion 21 of the hydraulic pump 20 is generally hollow in shape, having an opened end 22 and a closed end 23. In the illustrated embodiment, the housing portion 21 and the closed end 23 of the hydraulic pump 20 are formed as separate pieces that are secured together, although they may be formed from a single piece of material if desired. The housing portion 21 may have any desired shape. The housing portion 21 of the hydraulic pump 20 has a fluid inlet port 24 formed therein. The fluid inlet port 24 is adapted to communicate with a reservoir (not shown) containing a quantity of relatively low pressure hydraulic fluid. A pumping mechanism 25 is provided within the housing 21 of the hydraulic pump 20 and communicates with the fluid inlet port 24. The pumping mechanism 25 is connected to the output shaft 16 of the power take-off 10 so as to be rotatably driven whenever the power take-off 10 is operated. The pumping mechanism 25 is conventional in the art and may, if desired, be embodied as a self-contained pump cartridge that is quickly and easily interchangeable or replaceable as a unit. Regardless of the specific structure of the pumping mechanism 25, when the power take-off 10 is operated, the hydraulic pump 20 draws relatively low pressure hydraulic fluid from the reservoir through the fluid inlet port 24 and supplies a flow of relatively high pressure hydraulic fluid to the hydraulically driven device in the manner in detail described below.

The first embodiment of the combined power take-off and hydraulic pump assembly further includes an intermediate housing portion, indicated generally at 30, that is provided between the power take-off 10 and the hydraulic pump 20. As best shown in FIG. 2, the illustrated intermediate housing portion 30 is generally hollow in shape, having a first opened end 31 and a second opened end 32. However, the intermediate housing portion 30 may have any desired shape. The first opened end 31 of the intermediate housing portion 30 is sized and shaped to cooperate with the opened end 12 of the housing portion 11 of the power take-off 10 so as to provide sealing engagement therebetween. To accomplish, conventional flanges, seals, or other structures may be provided on or between the first opened end 31 of the intermediate housing portion 30 and the opened end 12 of the housing portion 11 of the power take-off 10. One or more bolts 31a may be used to secure the first opened end 31 of the intermediate housing portion 30 to the opened end 12 of the housing portion 11 of the power take-off 10. Similarly, the second opened end 32 of the intermediate housing portion 30 is sized and shaped to cooperate with the opened end 22 of the housing portion 21 of the hydraulic pump 20 so as to provide sealing engagement therebetween. To accomplish, conventional flanges, seals, or other structures may be provided on or between the second opened end 32 of the intermediate housing portion 30 and the opened end 22 of the housing portion 21 of the hydraulic pump 20. One or more bolts 32a may be used to secure the second opened end 32 of the intermediate housing portion 30 to the opened end 22 of the housing portion 21 of the hydraulic pump 20.

The intermediate housing portion 30 supports a bearing 33 that, in turn, rotatably supports the second end (the left end when viewing FIG. 2) of the output shaft 16 of the power take-off 10. The intermediate housing portion 30 has a fluid outlet port 34 formed therein. The fluid outlet port 34 is adapted to communicate with the hydraulically driven device (not shown). The pumping mechanism 25 provided within the housing 21 of the hydraulic pump 20 also communicates with the fluid outlet port 34. Thus, when the power take-off 10 is operated, the hydraulic pump 20 draws relatively low pressure hydraulic fluid from the reservoir and supplies a flow of relatively high pressure hydraulic fluid through the fluid outlet port 34 to the hydraulically driven device.

Thus, it can be seen that the intermediate housing portion 30 cooperates with both the housing portion 11 of the power take-off 10 and the housing portion 21 of the hydraulic pump 20 to provide an integrated enclosure for the first embodiment of the combined power take-off and hydraulic pump assembly. Additionally, the intermediate housing portion 30 functionally interacts with each of the power take-off 10 and the hydraulic pump 20 to reduce the overall length, weight, and number of parts of the first embodiment of the combined power take-off and hydraulic pump assembly. This functional interaction is accomplished by means of both the bearing 33 supported on the intermediate housing portion 30 and the fluid outlet port 34 formed in the intermediate housing portion 30. As discussed above, the bearing 33 rotatably supports the second end (the left end when viewing FIG. 2) of the output shaft 16 of the power take-off 10, while the fluid outlet port 34 provides communication between the pumping mechanism 25 of the hydraulic pump 20 and the hydraulically driven device. Thus, the overall length, weight, and number of parts of the first embodiment of the combined power take-off and hydraulic pump assembly is significantly reduced.

Figure 3:
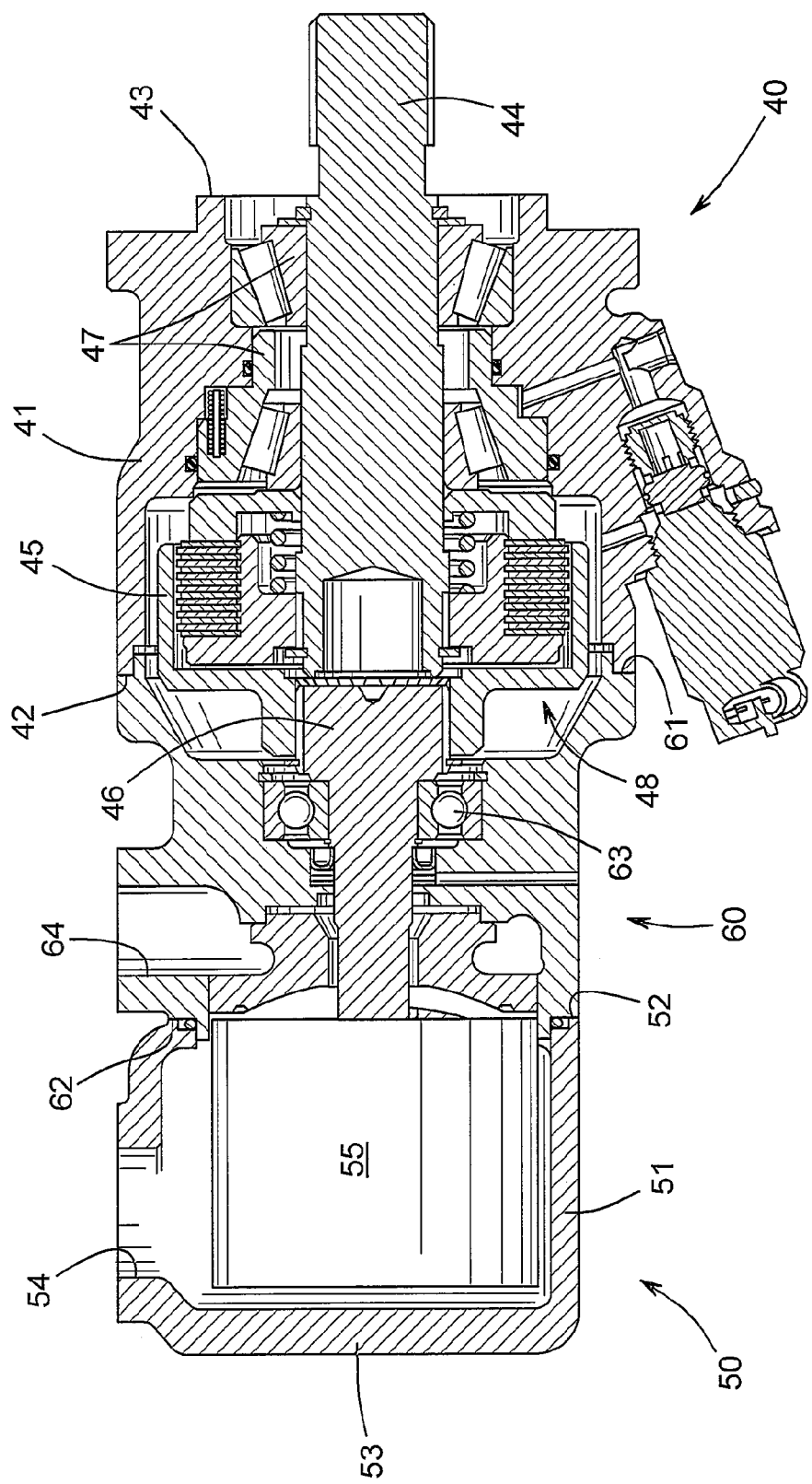
FIG. 3 is a sectional elevational view of a second embodiment of a combined power take-off and hydraulic pump assembly in accordance with this invention.

FIG. 3 illustrates a second embodiment of a combined power take-off and hydraulic pump assembly in accordance with this invention. The second embodiment of the combined power take-off and hydraulic pump assembly includes a power take-off, indicated generally at 40, having a housing portion 41. The illustrated housing portion 41 of the power take-off 40 is generally hollow in shape, having a first opened end 42 and a second opened end 43. The housing portion 41 may have any desired shape.

The power take-off 40 includes an input mechanism that is adapted to be connected to a source of rotational energy so as to be rotatably driven whenever the source of rotational energy is operated, as described above. In the illustrated embodiment, the input mechanism of the power take-off 40 includes an input shaft 44 that is supported on the housing portion 41 of the power take-off 40. It can be seen that the input shaft 44 extends axially outwardly from the second opened end 43 of the housing portion 41 of the power take-off 40. Thus, the power take-off 40 is commonly referred to as an "end mount" type of power take-off because it is typically mounted on an axial of a source of rotational power (such as a conventional transmission), as opposed to a lateral side thereof.

The power take-off 40 also includes an output mechanism that is adapted to be connected to a driven accessory, as also described above. In the illustrated embodiment, the output mechanism of the power take-off 40 includes an output gear 45 that keyed or otherwise connected for rotation with an output shaft 46. The input shaft 44 is supported for rotation by bearings 47 that are, in turn, supported on the housing portion 41 of the power take-off 40. The output shaft 46 is supported for rotation in a manner that will be described in detail below.

In the illustrated embodiment, the input shaft 44 of the power take-off 10 is connected though a clutch assembly, indicated generally at 48, to the output shaft 46. Thus, the output shaft 46 is rotatably driven only when the source of rotational energy is operated and the clutch assembly 48 is engaged. However, if desired, the input shaft 44 of the power take-off 10 may be directly to the output shaft 46 such that the output shaft 46 is always driven whenever the source of rotational energy is operated.

The second embodiment of the combined power take-off and hydraulic pump assembly also includes a hydraulic pump, indicated generally at 50, having a housing portion 51. The illustrated housing portion 51 of the hydraulic pump 50 is generally hollow in shape, having an opened end 52 and a closed end 53. In the illustrated embodiment, the housing portion 51 and the closed end 53 of the hydraulic pump 50 are formed from a single piece of material, although they may be formed as separate pieces that are secured together if desired. The housing portion 51 may have any desired shape. The housing portion 51 of the hydraulic pump 50 has a fluid inlet port 54 formed therein. The fluid inlet port 54 is adapted to communicate with a reservoir (not shown) containing a quantity of relatively low pressure hydraulic fluid. A pumping mechanism 55 is provided within the housing 51 of the hydraulic pump 50 and communicates with the fluid inlet port 54. The pumping mechanism 55 is connected to the output shaft 46 of the power take-off 40 so as to be rotatably driven whenever the power take-off 40 is operated and the clutch assembly 48 is engaged. The pumping mechanism 55 is conventional in the art and may, if desired, be embodied as a self-contained pump cartridge that is quickly and easily interchangeable or replaceable as a unit. Regardless of the specific structure of the pumping mechanism 55, when the power take-off 10 is operated and the clutch assembly 48 is engaged, the hydraulic pump 50 draws relatively low pressure hydraulic fluid from the reservoir through the fluid inlet port 54 and supplies a flow of relatively high pressure hydraulic fluid to the hydraulically driven device in the manner in detail described below.

The second embodiment of the combined power take-off and hydraulic pump assembly further includes an intermediate housing portion, indicated generally at 60, that is provided between the power take-off 40 and the hydraulic pump 50. In the illustrated embodiment, the intermediate housing portion 60 is generally hollow in shape, having a first opened end 61 and a second opened end 62. However, the intermediate housing portion 60 may have any desired shape. The first opened end 61 of the intermediate housing portion 60 is sized and shaped to cooperate with the first opened end 42 of the housing portion 41 of the power take-off 40 so as to provide sealing engagement therebetween. To accomplish, conventional flanges, seals, or other structures may be provided on or between the first opened end 61 of the intermediate housing portion 60 and the first opened end 42 of the housing portion 41 of the power take-off 40. One or more bolts (not shown) may be used to secure the first opened end 61 of the intermediate housing portion 60 to the first opened end 42 of the housing portion 41 of the power take-off 40. Similarly, the second opened end 62 of the intermediate housing portion 60 is sized and shaped to cooperate with the opened end 52 of the housing portion 51 of the hydraulic pump 50 so as to provide sealing engagement therebetween. To accomplish, conventional flanges, seals, or other structures may be provided on or between the second opened end 62 of the intermediate housing portion 60 and the opened end 52 of the housing portion 51 of the hydraulic pump 50. One or more bolts (not shown) may be used to secure the second opened end 62 of the intermediate housing portion 60 to the opened end 52 of the housing portion 51 of the hydraulic pump 50.

The intermediate housing portion 60 supports a bearing 63 that, in turn, rotatably supports the output shaft 46 of the power take-off 40. The intermediate housing portion 60 has a fluid outlet port 64 formed therein. The fluid outlet port 64 is adapted to communicate with the hydraulically driven device (not shown). The pumping mechanism 55 provided within the housing 51 of the hydraulic pump 50 also communicates with the fluid outlet port 64. Thus, when the power take-off 40 is operated and the clutch assembly 48 is engaged, the hydraulic pump 50 draws relatively low pressure hydraulic fluid from the reservoir and supplies a flow of relatively high pressure hydraulic fluid through the fluid outlet port 64 to the hydraulically driven device.

Thus, similar to the first embodiment of the combined power take-off and hydraulic pump assembly, the intermediate housing portion 60 cooperates with both the housing portion 41 of the power take-off 40 and the housing portion 51 of the hydraulic pump 50 to provide an integrated enclosure for the second embodiment of the combined power take-off and hydraulic pump assembly. Additionally, the intermediate housing portion 60 functions with each of the power take-off 40 and the hydraulic pump 50 to reduce the overall length, weight, and number of parts of the second embodiment of the combined power take-off and hydraulic pump assembly.

Figure 4:
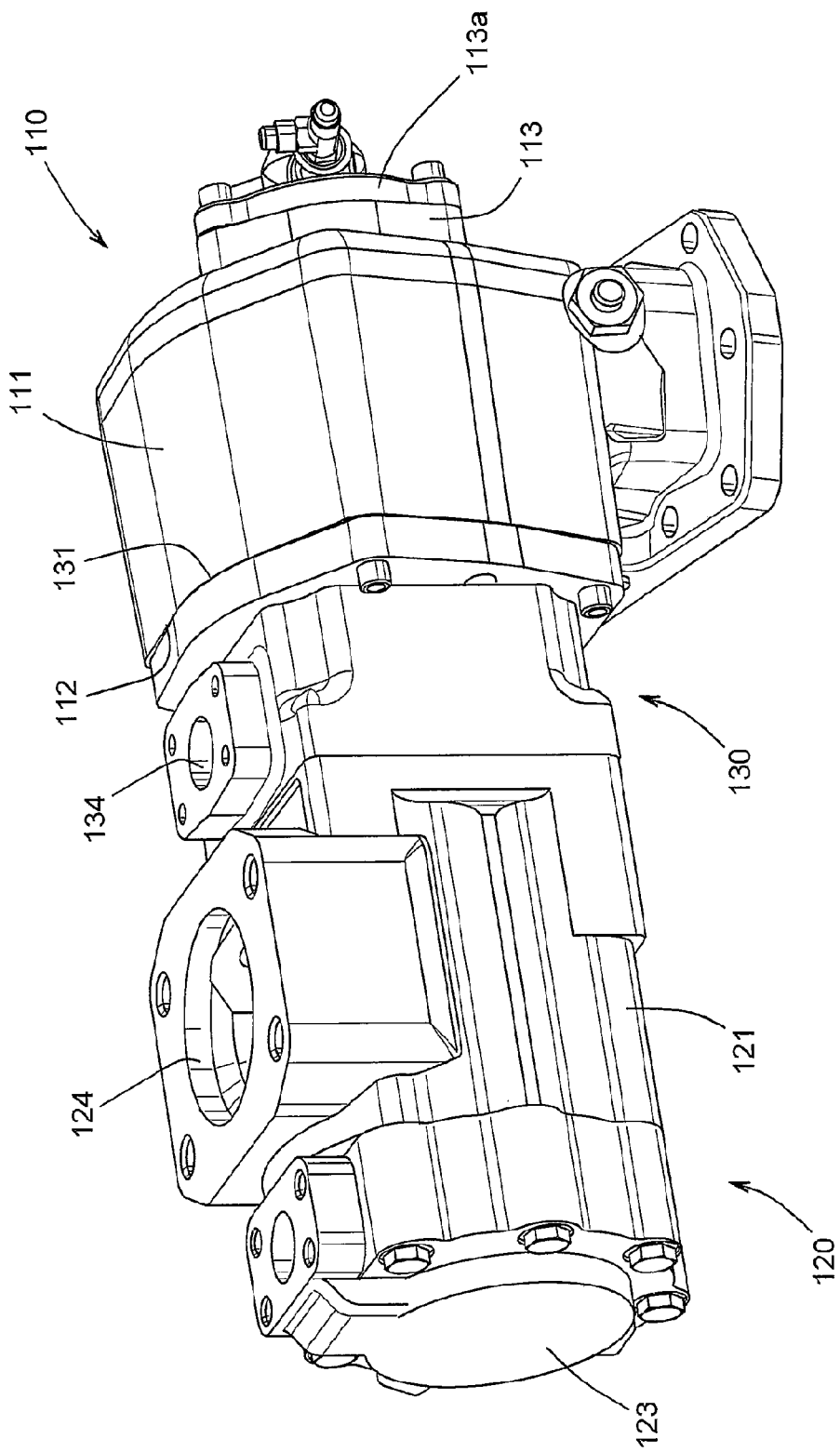
FIG. 4 is a perspective view of a third embodiment of a combined power take-off and hydraulic pump assembly in accordance with this invention.
Figure 5:
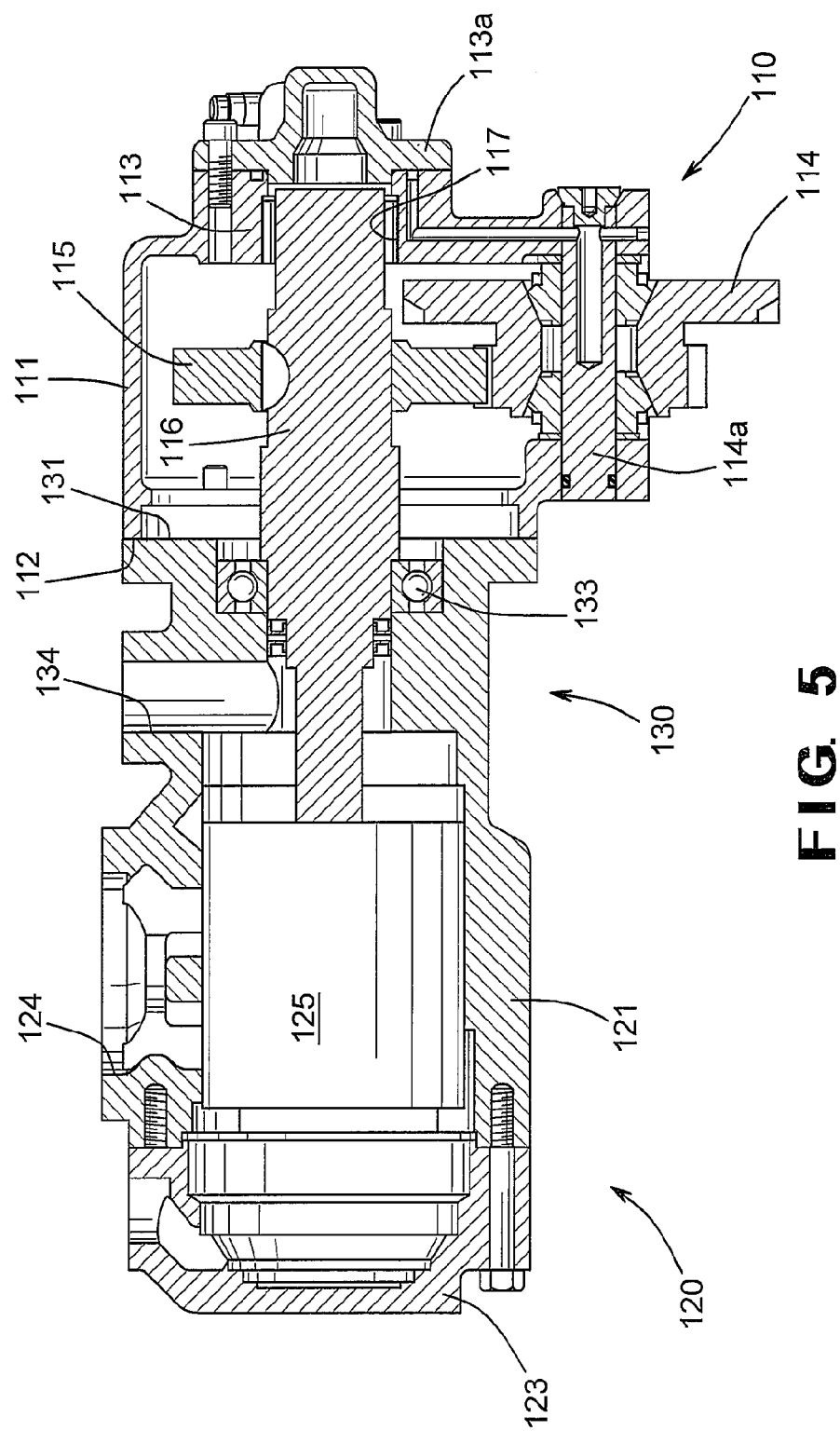
FIG. 5 is a sectional elevational view of the third embodiment of the combined power take-off and hydraulic pump assembly illustrated in FIG. 4.

FIGS. 4 and 5 illustrate a third embodiment of a combined power take-off and hydraulic pump assembly in accordance with this invention. The third embodiment of the combined power take-off and hydraulic pump assembly is similar to the first embodiment illustrated in FIGS. 1 and 2, and like reference numbers (incremented by 100) are used to indicate similar components. In the third embodiment, however, the housing portion 121 of the hydraulic pump 120 and the intermediate housing portion 130 are formed from a single piece of material, rather than from separate pieces of material as in the first embodiment. Otherwise, the structure and operation of the third embodiment of a combined power take-off and hydraulic pump assembly are the same as described above in connection with the first embodiment. Similarly, it will be appreciated that the housing portion 51 of the hydraulic pump 50 and the intermediate housing portion 60 of the second embodiment of the combined power take-off and hydraulic pump assembly illustrated in FIG. 3 may also be formed from a single piece of material, rather than from separate pieces of material.

Figure 6:
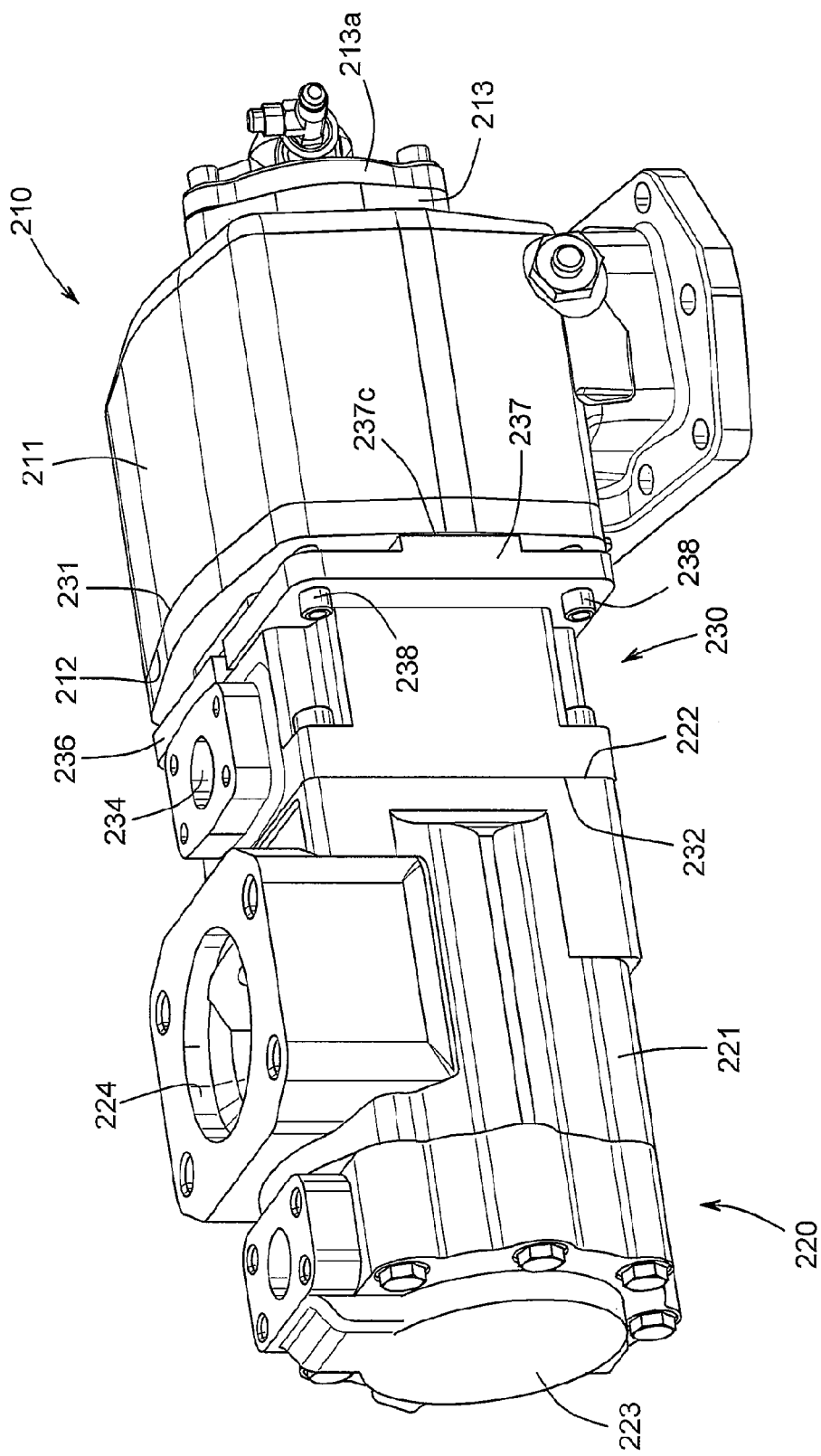
FIG. 6 is a perspective view of a fourth embodiment of a combined power take-off and hydraulic pump assembly in accordance with this invention.
Figure 7:
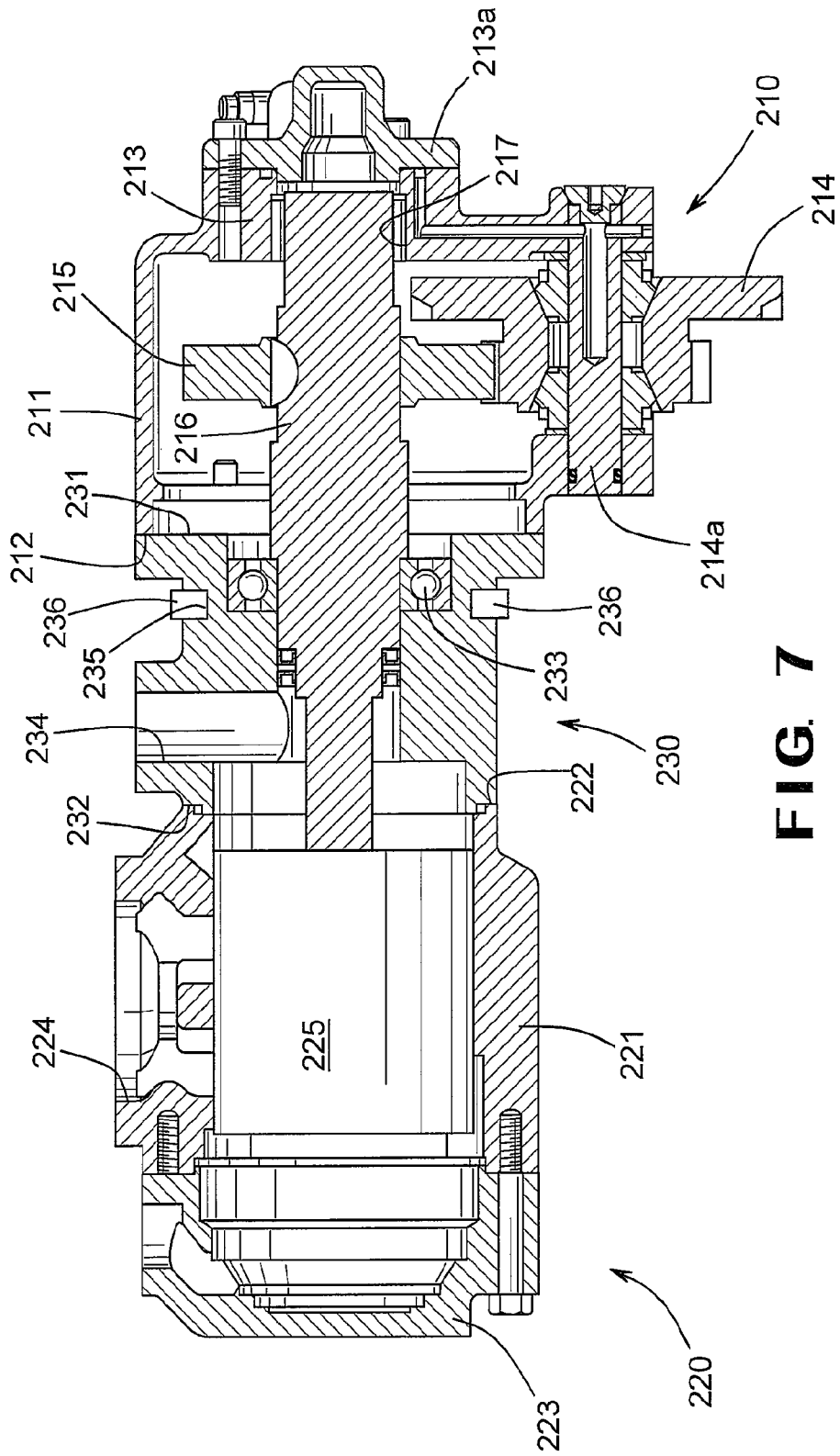
FIG. 7 is a sectional elevational view of the fourth embodiment of the combined power take-off and hydraulic pump assembly illustrated in FIG. 6.

FIGS. 6 and 7 illustrate a fourth embodiment of a combined power take-off and hydraulic pump assembly in accordance with this invention. The fourth embodiment of the combined power take-off and hydraulic pump assembly is also similar to the first embodiment illustrated in FIGS. 1 and 2, and like reference numbers (incremented by 200) are used to indicate similar components. In the fourth embodiment, however, the hydraulic pump 220 and the intermediate housing 230 can be positioned as a unit at any desired rotational orientation relative to the power take-off 210 and secured thereto. This can be accomplished by providing a mounting structure for the intermediate housing 230.

Figure 8:
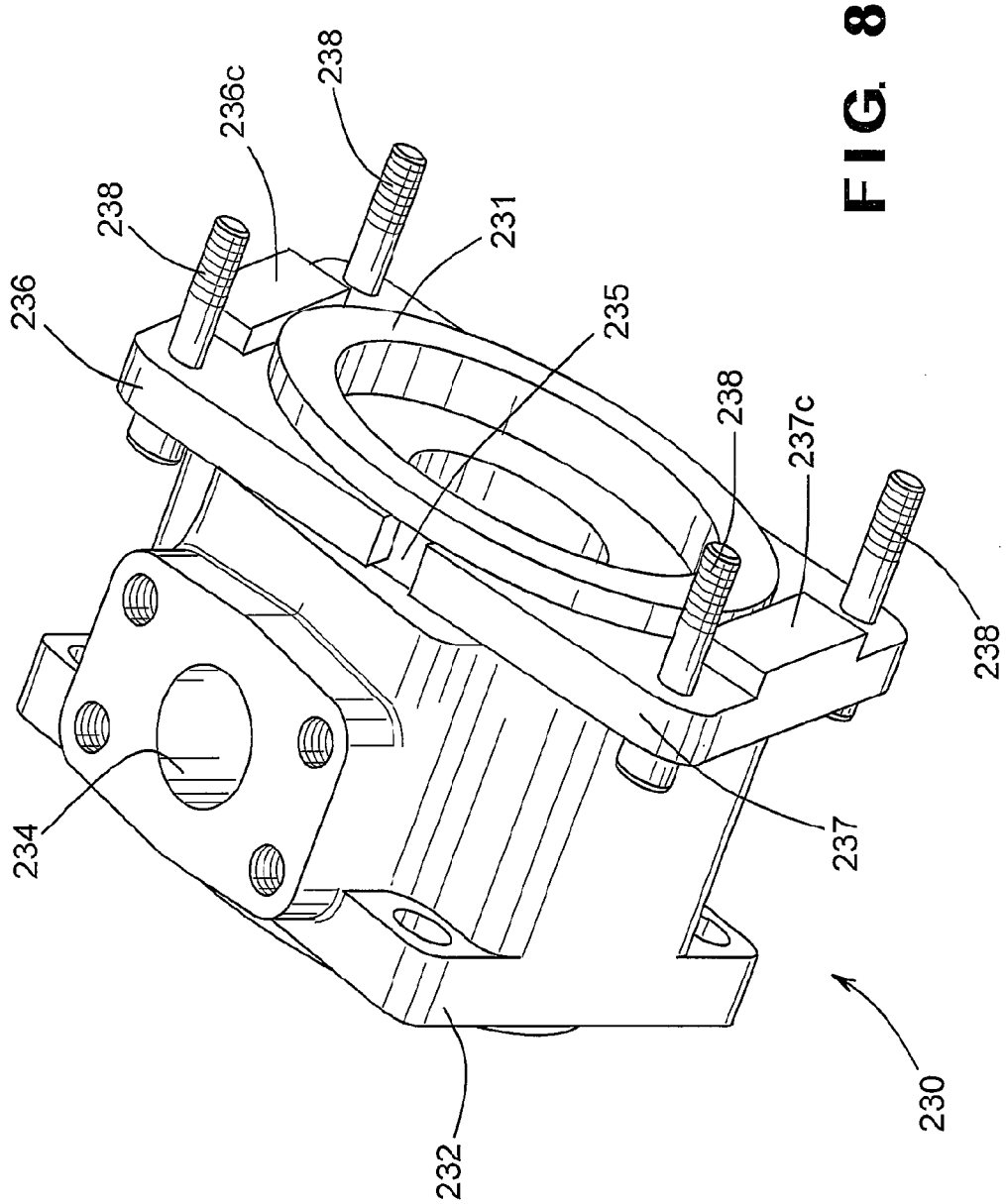
FIG. 8 is an enlarged perspective view of an intermediate housing and bracket assembly provided between the power take-off and the hydraulic pump in the fourth embodiment of the combined power take-off and hydraulic pump assembly illustrated in FIGS. 6 and 7.

As best shown in FIG. 8, the intermediate housing 230 has an annular groove 235 formed in the outer surface thereof adjacent to the first opened end 231 thereof. First and second clamping brackets 236 and 237 extend within the annular groove 235 to allow the intermediate housing 230 (and the hydraulic pump 220 secured thereto) to be positioned at any desired rotational orientation relative to the power take-off 210 and secured thereto.

The structure of the first and second clamping brackets 236 and 237 is best illustrated in FIGS. 9 and 10. As shown therein, the first and second clamping brackets 236 and 237 have respective inner surfaces 236*a* and 237*a* that are preferably sized and shaped to fit within the annular groove 235 so as to be circumferentially slidable relative to the intermediate housing 230, while permitting only a minimum amount of relative axial movement therebetween. Each of the first and second clamping brackets 236 and 237 also has one or more apertures 236*b* and 237*b*, respectively, formed therethrough for a purpose that will be explained below. Lastly, the first and second clamping brackets 236 and 237 may further have respective enlarged thickness regions 236*c* and 237*c* provided therein, again for a purpose that will be explained below.

To install the intermediate housing 230 on the power take-off 210, the first opened end 231 of the intermediate housing 230 is positioned adjacent to the opened end 211 of the power take-off 210 at a desired rotational orientation relative thereto. When the desired relative rotational orientation has been achieved, the first and second clamping brackets 236 and 237 are disposed such that the inner surfaces 236*a* and 237*a* thereof engage the outer surface of the annular groove 235, as best shown in FIG. 8. The apertures 236*b* and 237*b* respectively formed through the first and second clamping brackets 236 and 237 are aligned with corresponding threaded bores (not shown) formed in the housing 211 of the power take-off 220, thereby allowing bolts 238 to be inserted therethrough to secure the intermediate housing 230 (and the hydraulic pump 220 secured thereto) to the power take-off 210 at the desired relative rotational orientation. The enlarged thickness regions 236*c* and 237*c* are preferably sized such that when the first and second clamping brackets 236 and 237 are installed into the annular groove 235, they are generally flush with the opened end 231 of the intermediate housing 230, as shown in FIG. 8. As a result, the axial forces generated by the tightening of the bolts 238 are prevented from damaging either the opened end 231 of the intermediate housing 230 or the first and second clamping brackets 236 and 237.

Figure 11:
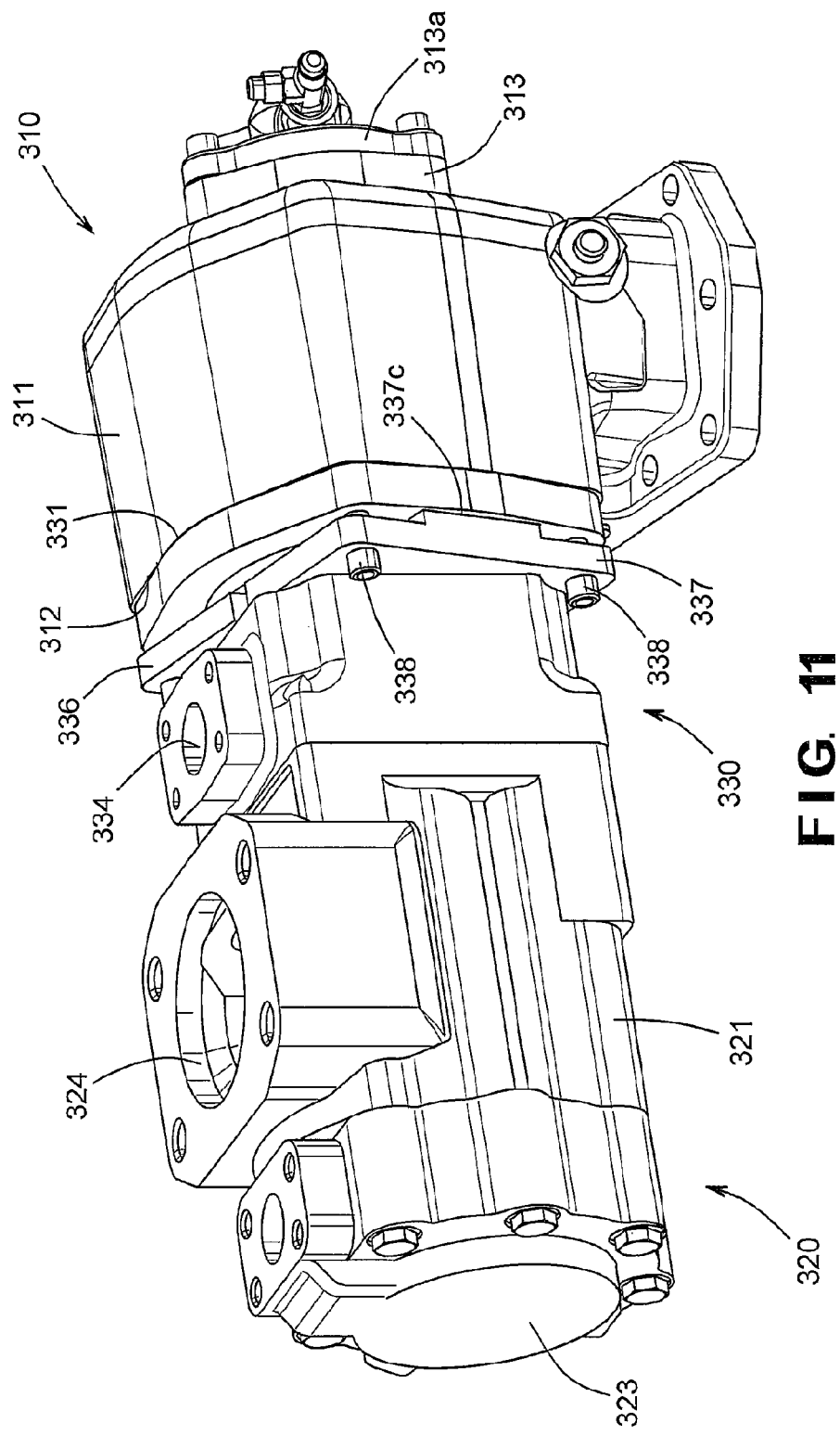
FIG. 11 is a perspective view of a fifth embodiment of a combined power take-off and hydraulic pump assembly in accordance with this invention.
Figure 12:
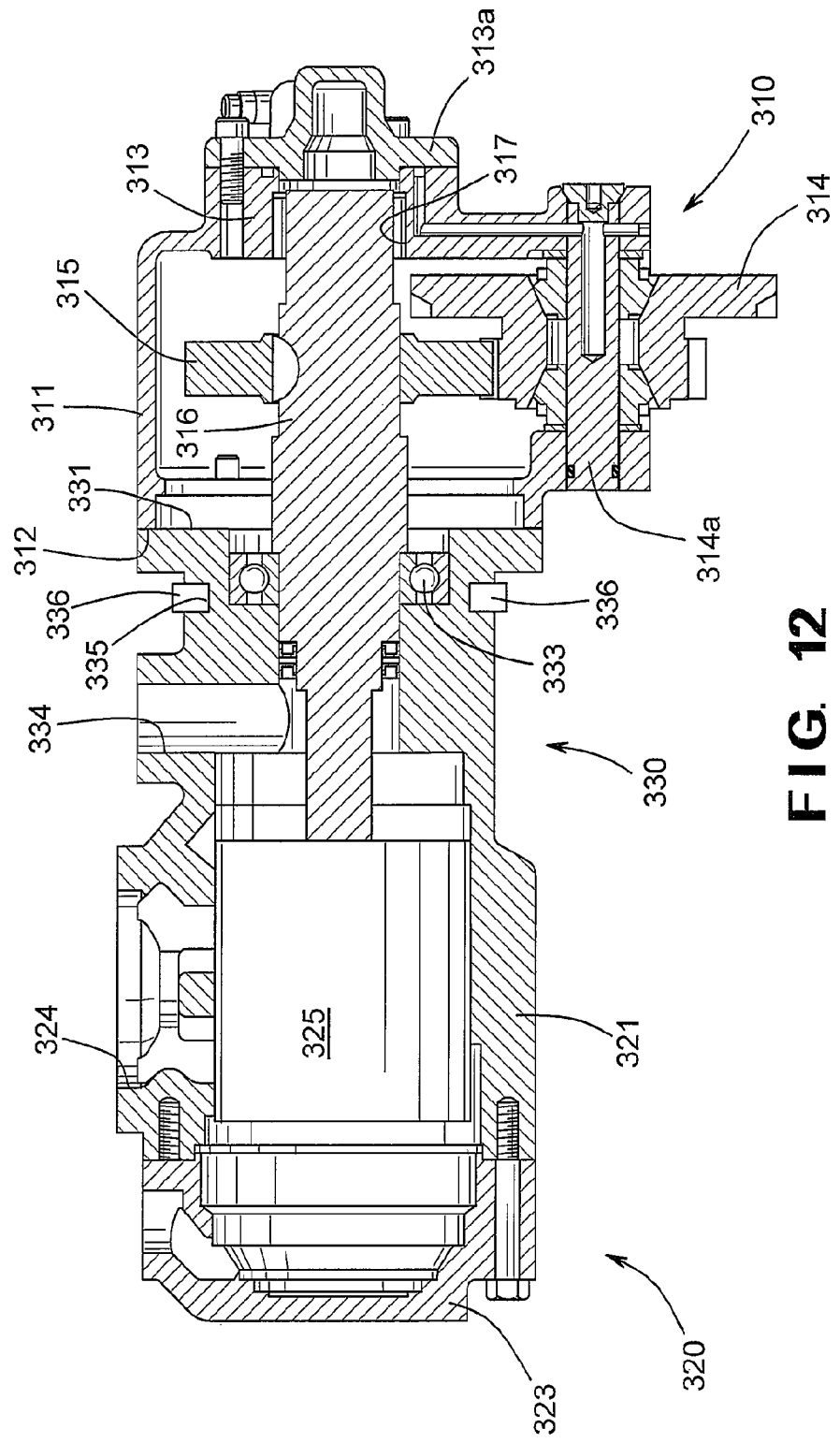
FIG. 12 is a sectional elevational view of the fifth embodiment of the combined power take-off and hydraulic pump assembly illustrated in FIG. 11.

FIGS. 11 and 12 illustrate a fifth embodiment of a combined power take-off and hydraulic pump assembly in accordance with this invention. The fifth embodiment of the combined power take-off and hydraulic pump assembly is similar to the third embodiment illustrated in FIGS. 4 and 5, and like reference numbers (incremented by 200) are used to indicate similar components. In the fifth embodiment, however, the hydraulic pump 320 and the intermediate housing 330 can be positioned as a unit at any desired rotational orientation relative to the power take-off 310 and secured thereto. This can be accomplished by providing a mounting structure for the intermediate housing 330 that is similar to the intermediate housing 230 described above in connection with the fourth embodiment of the combined power take-off and hydraulic pump assembly and illustrated in FIGS. 6 through 10. Thus, the intermediate housing 330 has an annular groove 335 formed in the outer surface thereof adjacent to the first opened end 331 thereof. First and second clamping brackets 336 and 337 extend within the annular groove 335 to allow the intermediate housing 330 (and the hydraulic pump 320 secured thereto) to be positioned at any desired rotational orientation relative to the power take-off 310 and secured thereto.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A combined power take-off and hydraulic pump assembly comprising:
    a power take-off including a housing portion having an opened end;
    a hydraulic pump including a housing portion having an opened end; and
    an intermediate housing having a first opened end that cooperates with the opened end of the housing portion of the power take-off and a second opened end that cooperates with the opened end of the housing portion of the hydraulic pump, wherein the hydraulic pump is connected to be driven by the power take-off, wherein:
    the intermediate housing includes a mounting structure that allows the hydraulic pump and the intermediate housing to be positioned as a unit at a desired rotational orientation relative to the power take-off; and
    the mounting structure includes a groove provided in the intermediate housing and a clamping bracket that extends within the groove and is connected to the housing portion of the power take-off.

2. The combined power take-off and hydraulic pump assembly defined in claim 1 wherein the power take-off includes an input mechanism that is adapted to be connected to the source of rotational energy and an output mechanism that is connected to the hydraulic pump.

3. The combined power take-off and hydraulic pump assembly defined in claim 2 wherein the output mechanism of the power take-off is supported on both the housing portion of the power take-off and on the intermediate housing.

4. The combined power take-off and hydraulic pump assembly defined in claim 2 wherein the power take-off further includes a clutch for selectively connecting the output mechanism to the input mechanism.

5. The combined power take-off and hydraulic pump assembly defined in claim 1 wherein the hydraulic pump includes a fluid inlet port that is adapted to communicate with a reservoir containing a quantity of relatively low pressure hydraulic fluid and a pumping mechanism that is connected to be rotatably driven by the power take-off.

6. The combined power take-off and hydraulic pump assembly defined in claim 5 wherein the intermediate housing has a fluid outlet port that communicates with the pumping mechanism and that is adapted to communicate with a hydraulically driven device.

7. The combined power take-off and hydraulic pump assembly defined in claim 1 wherein the housing portion of the power take-off and the intermediate housing are formed from a single piece of material.

8. The combined power take-off and hydraulic pump assembly defined in claim 1 wherein the mounting structure includes first and second clamping brackets that each extend within the groove and are each connected to the housing portion of the power take-off.

9. A combined power take-off and hydraulic pump assembly comprising:
    a power take-off including a housing portion having an opened end, an input mechanism that is adapted to be connected to a source of rotational energy, and an output mechanism that is rotatably driven by the input mechanism;
    a hydraulic pump including a housing portion having an opened end, a fluid inlet port that is adapted to communicate with a reservoir containing a quantity of relatively low pressure hydraulic fluid, and a pumping mechanism that is connected to be rotatably driven by the output mechanism of the power take-off; and
    an intermediate housing having a first opened end that cooperates with the opened end of the housing portion of the power take-off and a second opened end that cooperates with the opened end of the housing portion of the hydraulic pump, the intermediate housing having a fluid outlet port that communicates with the pumping mechanism and that is adapted to communicate with a hydraulically driven device; wherein
    the intermediate housing includes a mounting structure that allows the hydraulic pump and the intermediate housing to be positioned as a unit at a desired rotational orientation relative to the power take-off; and
    the mounting structure includes a groove provided in the intermediate housing and a clamping bracket that extends within the groove and is connected to the housing portion of the power take-off.

10. The combined power take-off and hydraulic pump assembly defined in claim 9 wherein the output mechanism of the power take-off is supported on both the housing portion of the power take-off and on the intermediate housing.

11. The combined power take-off and hydraulic pump assembly defined in claim 9 wherein the power take-off further includes a clutch for selectively connecting the output mechanism to the input mechanism.

12. The combined power take-off and hydraulic pump assembly defined in claim 9 wherein the housing portion of the power take-off and the intermediate housing are formed from a single piece of material.

13. The combined power take-off and hydraulic pump assembly defined in claim 9 wherein the mounting structure includes first and second clamping brackets that each extend within the groove and are each connected to the housing portion of the power take-off.

14. A combined power take-off and hydraulic pump assembly comprising:
    a power take-off including a housing portion having an opened end;
    a hydraulic pump including a housing portion supporting a pumping mechanism that is driven by the power take-off, the housing portion of the hydraulic pump having (1) an opened end and (2) a fluid inlet port provided therein that communicates with the pumping mechanism and is adapted to communicate with a reservoir containing hydraulic fluid; and
    an intermediate housing having (1) a first opened end that cooperates with the opened end of the housing portion of the power take-off, (2) a second opened end that cooperates with the opened end of the housing portion of the hydraulic pump, and (3) a fluid outlet port provided therein that communicates with the pumping mechanism and is adapted to communicate with a hydraulically driven device located externally of the combined power take-off and hydraulic pump assembly; wherein the intermediate housing includes a mounting structure that allows the hydraulic pump and the intermediate housing to be positioned as a unit at a desired rotational orientation relative to the power take-off; and the mounting structure includes a groove provided in the intermediate housing and a clamping bracket that extends within the groove and is connected to the housing portion of the power take-off.

15. The combined power take-off and hydraulic pump assembly defined in claim 14 wherein the pumping mechanism is directly driven by the power take-off.

16. The combined power take-off and hydraulic pump assembly defined in claim 14 wherein the pumping mechanism is selectively driven through a clutch assembly by the power take-off.

17. The combined power take-off and hydraulic pump assembly defined in claim 14 wherein the housing portion of the hydraulic pump and the intermediate housing are formed from a single piece of material.

18. The combined power take-off and hydraulic pump assembly defined in claim 14 wherein the mounting structure includes first and second clamping brackets that each extend within the groove and are each connected to the housing portion of the power take-off.

\* \* \* \* \*